United States Patent
Britt et al.

(10) Patent No.: US 7,647,530 B2
(45) Date of Patent: Jan. 12, 2010

(54) NETWORK FAULT PATTERN ANALYZER

(75) Inventors: Steven V. Britt, Roseville, CA (US);
Devon L. Dawson, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 11/580,449

(22) Filed: Oct. 13, 2006

(65) Prior Publication Data
US 2008/0155346 A1    Jun. 26, 2008

(51) Int. Cl.
*G06F 11/00* (2006.01)
(52) U.S. Cl. ........................................... 714/43
(58) Field of Classification Search ............ 714/2–4, 714/15, 16, 21, 26, 37, 43, 45, 56
See application file for complete search history.

(56) References Cited

U.S. PATENT DOCUMENTS

| | | | |
|---|---|---|---|
| 6,105,065 A * | 8/2000 | Rao et al. | 709/224 |
| 6,834,304 B1 * | 12/2004 | Nisbet et al. | 709/224 |
| 6,917,888 B2 * | 7/2005 | Logvinov et al. | 702/59 |
| 7,043,661 B2 * | 5/2006 | Valadarsky et al. | 714/4 |
| 7,120,819 B1 * | 10/2006 | Gurer et al. | 714/4 |
| 7,203,879 B2 * | 4/2007 | Shabib et al. | 714/732 |
| 2003/0084146 A1 * | 5/2003 | Schilling et al. | 709/224 |
| 2006/0156086 A1 * | 7/2006 | Flynn et al. | 714/712 |

* cited by examiner

*Primary Examiner*—Nadeem Iqbal (57) ABSTRACT

Network state information and network topology information associated with a network is retrieved and transformed using a meta-language. The transformed data is compared against known network fault patterns to identify a matching network fault signature. The matching network fault signature is used to diagnose potential cause(s) of network problems that resulted in the matched signature.

25 Claims, 6 Drawing Sheets

NETWORK FAULT PATTERN ANALYZER

TECHNICAL FIELD

The present invention relates broadly to network management. More specifically, embodiments of the present invention relate to analyzing network faults.

BACKGROUND

A network system generally includes a number of devices connected so as to allow communication among the devices such as desktop machines, servers, hosts, printers, fax machines, switches, and routers. Nowadays, due to the advantages (e.g., cost benefits and productivity gains) created by network technology in communication provided by networks, businesses and other organizations are increasingly dependent on their networks. Consequently, today's networks are often highly complex and include numerous devices. Furthermore, the network topology and network traffic may change as the network evolves with additional newer devices added to the network, or the removal of older devices from the network. As the network changes and grows increasingly large and complex, effective network management has become increasingly vital to businesses and other organizations.

Network management encompasses several areas including configuration management, accounting management, fault management, security management, and performance management. In particular, the area of fault management deals with being able to detect network faults, notifying users of network faults, logging network faults, and fixing network faults in order to keep the network operating efficiently and productively. As network faults can cause considerable network degradation and/or downtime, successful fault management is an important aspect of good network management.

However, conventionally, network management products are more focused on network monitoring and are limited in their actual network analysis capabilities. Many network management products that are aimed at large enterprise customers must support heterogeneous devices (a mix of devices from different vendors). Because such network management products are usually focused on breadth of analysis rather than depth of analysis, they are often constrained by the limited commonality across the heterogeneous devices. On the other hand, while network management products aimed at smaller customers tend to provide better command and control capabilities for their homogeneous (single vendor) devices than their counterparts that are aimed at larger enterprises, they are often less sophisticated in their capabilities and lack the ability to diagnose the root cause of network faults. Such network management products provide better command and control capabilities than their enterprise-focused counterparts because they assume a relatively homogenous environment, a situation that is more often encountered with smaller network deployments. Finally, for other network management products that can discover and compute topology for heterogeneous devices, the command and control capabilities across the devices are usually still segregated (typically by device vendor) by a hodgepodge of vendor-specific tools that plug into the heterogeneous management platform. This scenario generally results in a plethora of data for the network administrator to interpret when attempting to identify, analyze, and rectify network faults because of the differences in capability and presentation between the various vendors' tools.

SUMMARY

Network state information and network topology information associated with a network is retrieved and transformed using a meta-language. The transformed data is compared against known network fault patterns to identify problems in which the data matches such a pattern. The known causes of the network fault pattern, sometimes called a network fault signature, that was matched may then be used to infer possible causes of the existing network problem(s).

DETAILED DESCRIPTION

Network fault pattern analyzing systems are described. Reference will now be made in detail to embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

In overview, embodiments pertain to a network fault pattern analyzer that both allows data collected from a source (e.g. a network manager application, a client, and a plurality of devices) to be transformed into data expressed by a meta-language and identifies network fault signatures from which a root cause of network faults is further diagnosed. More specifically, the present embodiment can receive a set of data in different languages from a variety of devices and/or sources and utilize the set of data as if the data is of one language. By being able to utilize the information included in the first set of data in a meta-language format, the present embodiment can compare the data received with patterns that result from known network faults in an attempt to match a network fault signature. Further, by being able to identify data that matches a network fault signature, the present embodiment can diagnose possible root causes of the network fault patterns through inference using the possible root causes that can produce the matched signature. This means that the present embodiment can consume and/or interpret the wealth of collected data in place of the user (also referred to as a client) and provide a complexity and depth of analysis that is not usually feasible (economically or otherwise) for the user to perform manually. In some instances, the present embodiment will be able to utilize input from the user in identifying a network fault signature and/or diagnosing the root cause of the network fault signatures. Further, in other instances, the present embodiment will be able to receive a request for data associated with the network (e.g., network fault signature and cause of the network fault signature) from the user and/or transmit data associated with the network to the user. In one embodiment, the present embodiment also includes either suggesting remedial actions that the user might take, or taking one or more remedial actions suggested to user by the present embodiment at the end of a network fault pattern analysis.

Figure 1:
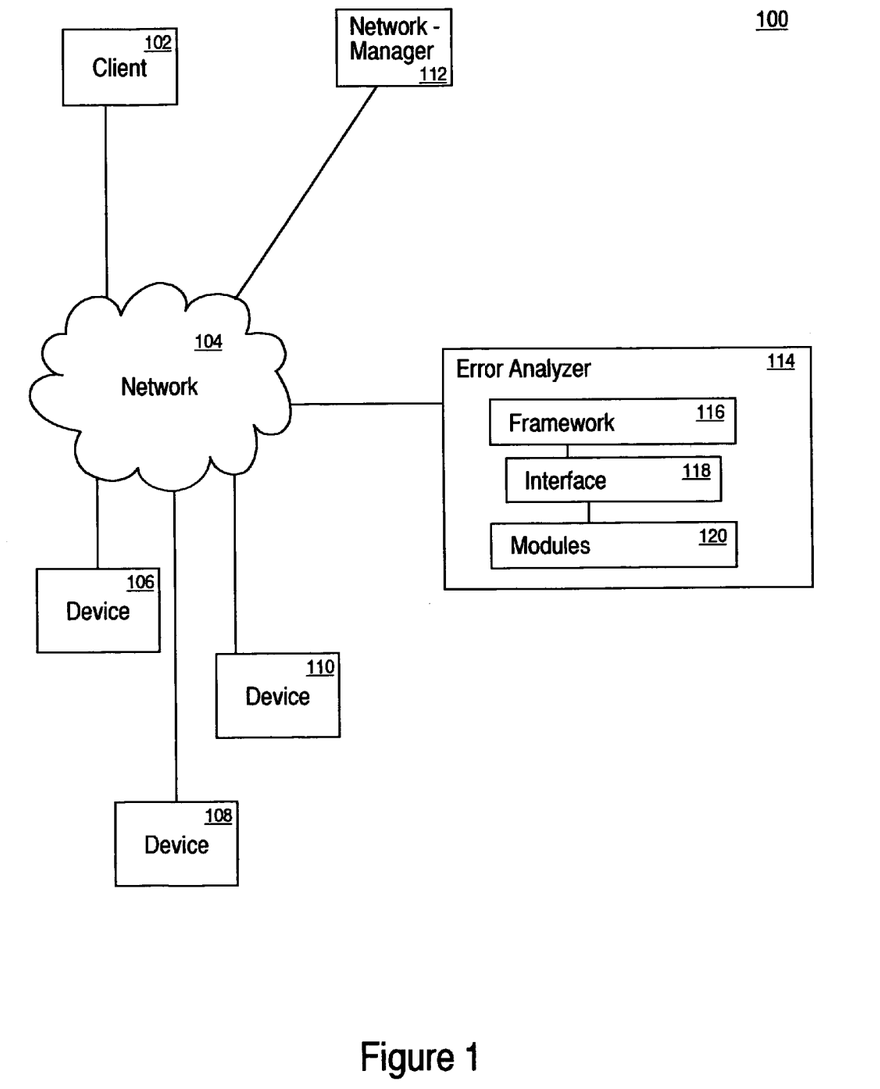
FIG. 1 illustrates a block diagram of an exemplary system upon which embodiments may be implemented.

FIG. 1 is a block diagram of an exemplary system 100 upon which embodiments may be implemented. The system 100 shows the components of an exemplary network fault pattern analyzing system in accordance with the present embodiment. As depicted in FIG. 1, the exemplary network fault pattern analyzing system 100 includes a client 102, a network manager 112, a plurality of devices (e.g., 106, 108, and 110), and a network fault pattern analyzer 114 (also referred to as fault analyzer) all coupled with one another via a network 104. Although system 100 is shown and described as having certain numbers and types of elements, the present embodiment is not so limited; that is, system 100 may include elements other than those shown, and may include more than one of the elements that are shown.

In the present embodiment depicted by FIG. 1, the network manager application 112 is the source from which the fault analyzer 114 collects a set of data associated with the network 104. The data collected (also referred to as first data) can be used by the fault analyzer 114 to identify a network fault signature and to diagnose potential causes for the issues that produced data matching the network fault signature. The fault analyzer 114 is able to utilize first data even if first data includes data in different languages from a variety of devices (e.g., device 106, device 108, and device 110) because the fault analyzer can translate first data into a second set of data using a meta-language. Thus the fault analyzer 114 can analyze the network 104 for one or more network fault signatures indicative of one or more existing and/or emerging issue(s) within the network 104.

In reference to the present embodiment depicted by FIG. 1, the fault analyzer 114 is a standalone application that extracts first data from a separate network management application 112; however, in an alternate embodiment, the fault analyzer 114 could also be a module that is encompassed within a network management application 112. The fault analyzer 114 includes a set of modules 120 and a framework 116 into which the modules 120 could be plugged. Each of the individual modules may focus on analyzing incoming data for a signature that indicates a specific type of problem. In this embodiment, a well-defined interface 118 exists between the framework and the modules. The interface 118 allows the framework 116 to control operation of the modules 120 and to permit the modules 120 to pass status information about the network back to the framework 116.

As depicted by system 100, network 104 is a data communications system that interconnects devices. The network 104 can be implemented in a wide variety of ways. For example, network 104 can be implemented as, but not limited to, a local area network (LAN), a metropolitan area network (MAN), a wide area network (WAN), a storage area network, and/or the Internet. In one embodiment, network 104 is a wireless network.

The client 102 of the system 100, depicted by FIG. 1, can be an individual user device, an application program, an enterprise, or a service provider. The client 102 can issue a request for information (also referred to as third data) to the fault analyzer 114 and/or receive information associated with the network 104 transmitted by the fault analyzer 114. As mentioned above, the client 102 can also provide input to the fault analyzer 114 to facilitate identification of one or more network fault signatures and/or diagnoses of the root cause of the network fault signature(s). Additionally, the client 102 may select an appropriate remedial measure suggested by the fault analyzer 114 for the fault analyzer 114 to perform.

Figure 2A:
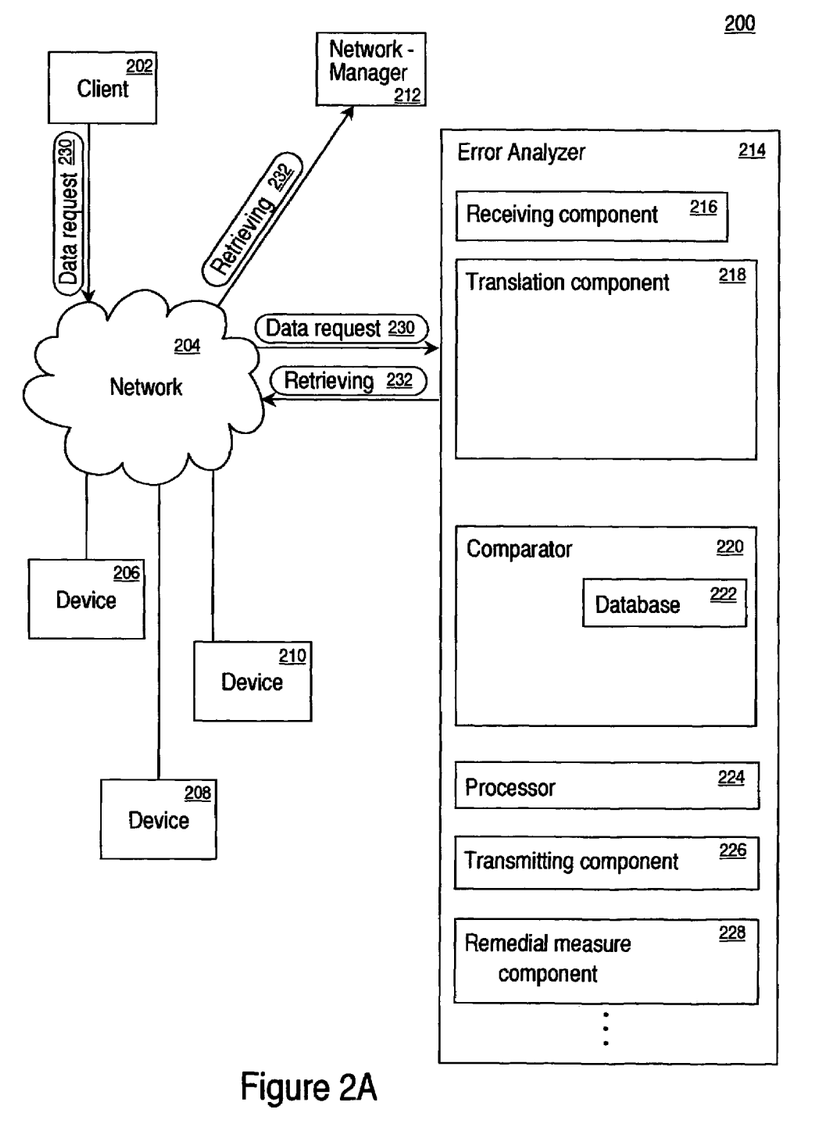
FIG. 2A illustrates a block diagram of an exemplary embodiment in operation.
Figure 2B:
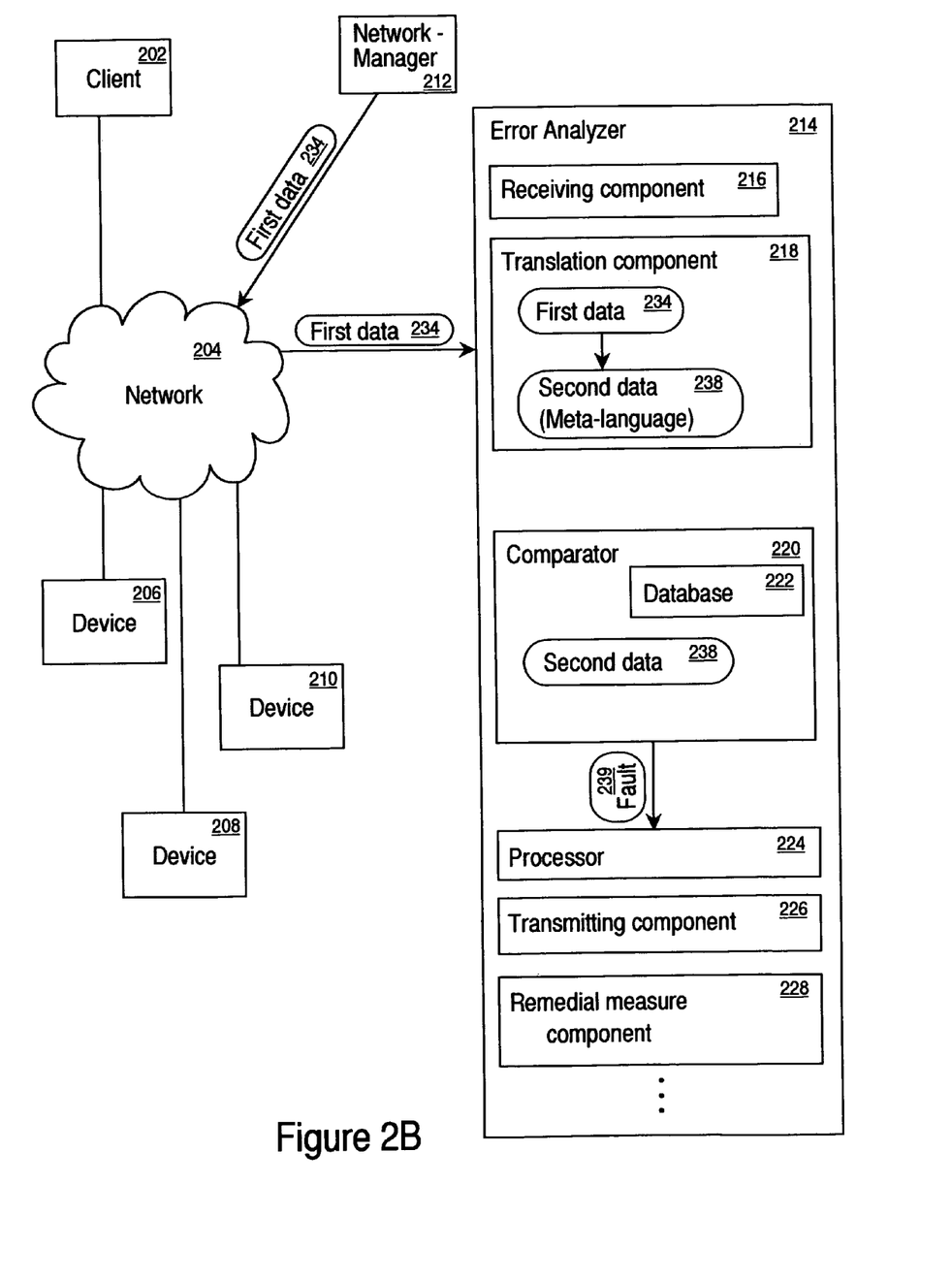
FIG. 2B illustrates a block diagram of an exemplary embodiment in operation.
Figure 2C:
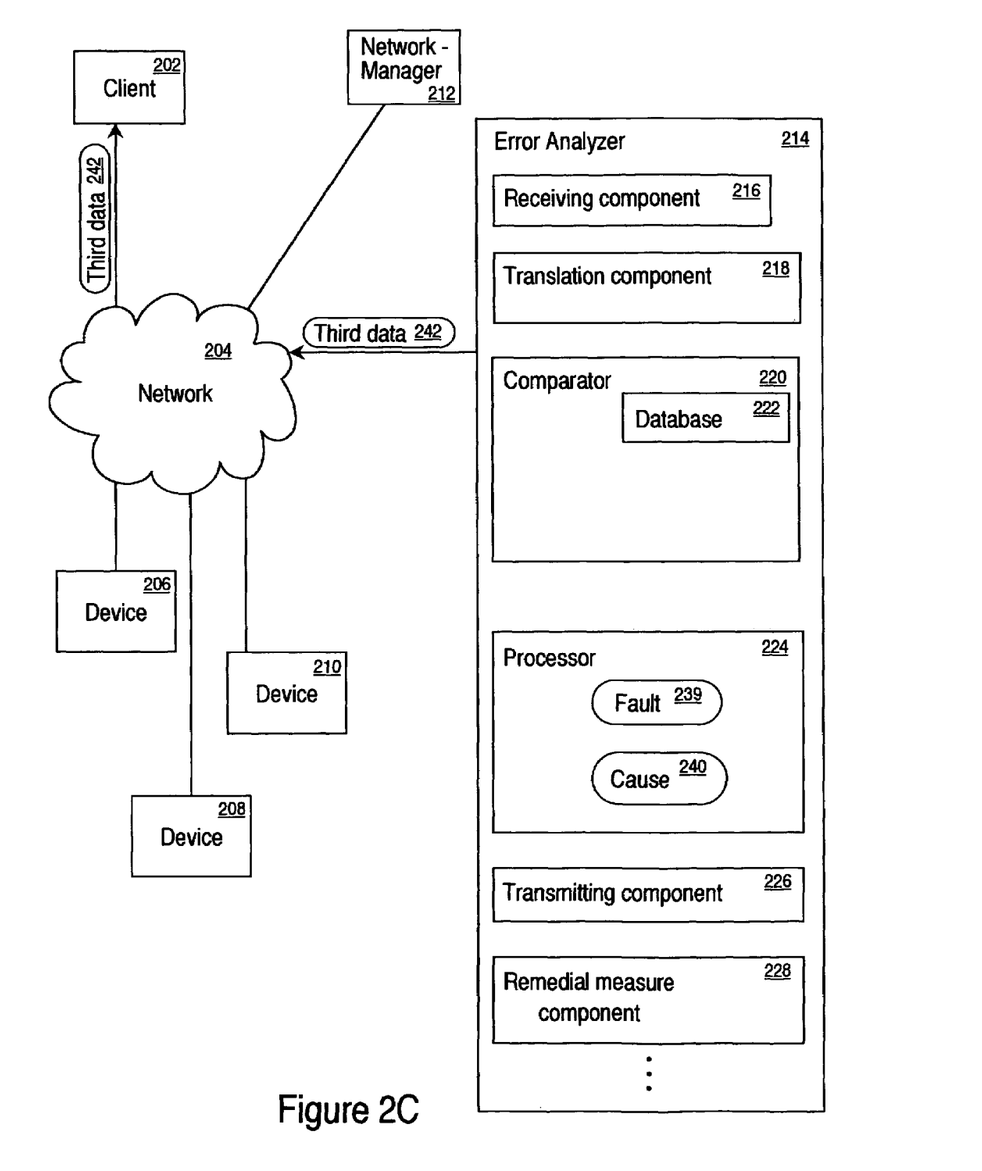
FIG. 2C illustrates a block diagram of an exemplary embodiment in operation.

FIGS. 2A, 2B, and 2C illustrate block diagrams of an embodiment in operation. The system 200 includes a client 202, a plurality of devices (e.g., device 206, device 208, and device 210), a network manager application 212, a network 204, and a network fault pattern analyzer (also referred to as fault analyzer 214). The components of the system 200 are coupled to one another via the network 204. In this embodiment, fault analyzer 214 includes a receiving component 216, a translation component 218, a comparator 220, a processor 224, a transmitting component 226, and a remedial measure component 228. Furthermore, in present embodiment, the comparator 220 includes a database 222.

In FIGS. 2A-2C, the present embodiment is described in the context of an example in which the client 202 send a data request 230 to the fault analyzer 214 for a set of information (also referred to as third data) to be displayed to the client 202. In addition, in this example, the fault analyzer is not depicted in the form of a framework and a set of modules. Furthermore, in this example, the set of information requested includes the potential root cause(s) of fault(s) within the network 204 and possible remedial measure(s) to be taken by the client 202; however, this example can be readily extended to other situations and embodiments. For example, the fault analyzer 214 can be embodied as having a framework and a set of modules that, once activated, can continuously monitor the network 204 and take remedial measures without further input from the client 202.

In reference now to FIG. 2A, in operation, in present embodiment, the client 202 sends a request for information (e.g., data request 230) to the fault analyzer 214 via the network 204. The receiving component 216 of the fault analyzer 214 receives the data request 230. The fault analyzer 214 then sends a retrieving signal 232 to the network manager application 212 via the network 204. In the present embodiment, the retrieving signal 232 is a signal requesting a set of information associated with the network 204. The set of information requested from the network manager application 212 is also referred to as first data. The retrieving signal 232 is sent to the network manager 212 because, in this embodiment, there is a network manager application that has already collected the information required by the fault analyzer 214. In another embodiment, the retrieving signal 232 is sent to other components of the system. For example, the retrieving signal 232 can be sent to the plurality of devices (e.g., device 206, device 208, and device 210) in addition to the network manager application 212, or in place of the network manager application 212 if there is no network manager application 212 connected to the network 204.

In reference to FIG. 2B, in one embodiment, in operation, the network manager application 212 processes the retrieving signal 232. The network manager application 212 then sends the information requested (e.g., first data 234) to the fault analyzer 214 via the network 204. In the present embodiment, the fault analyzer 214 receives the information requested (also referred to as first data) through the receiving component 216 of fault analyzer 214. The fault analyzer 214 then translates first data into a second set of information (e.g., second data 238) using a meta-language by utilizing the translation component 218 of the fault analyzer. Further, the comparator 220 of the fault analyzer compares second data to known network fault patterns stored in database 222 for a match. If a match is found between second data 238 and a known network fault pattern then the comparator will indicate that a known network fault signature has been matched or identified. In the present embodiment, several known network fault patterns are matched to second data 238 to identify the network fault signatures that were detected in the network 204 (e.g., fault 239) to the processor 224 of the fault analyzer 214.

In reference to FIG. 2C, in operation, in one embodiment, the network fault signatures 239 identified in network 204 by the comparator 220 of the fault analyzer 214 are used by the processor 224 of the fault analyzer 214 to diagnose one or more potential root cause(s) (e.g., cause 240) of network fault(s) corresponding to the network fault signature(s) 239 (e.g., fault 239). The matched signature and corresponding potential root cause information (also referred to as third data 242) is transmitted via the network 204 to the client 202 by the transmitting component 226 of the fault analyzer 214. Third data 242 can include a variety of information. For example, in the present embodiment, along with the matched signatures and potential root cause(s) of fault(s) within the network 204, the possible remedial measures to be taken by the client 202 may also be transmitted.

Figure 3:
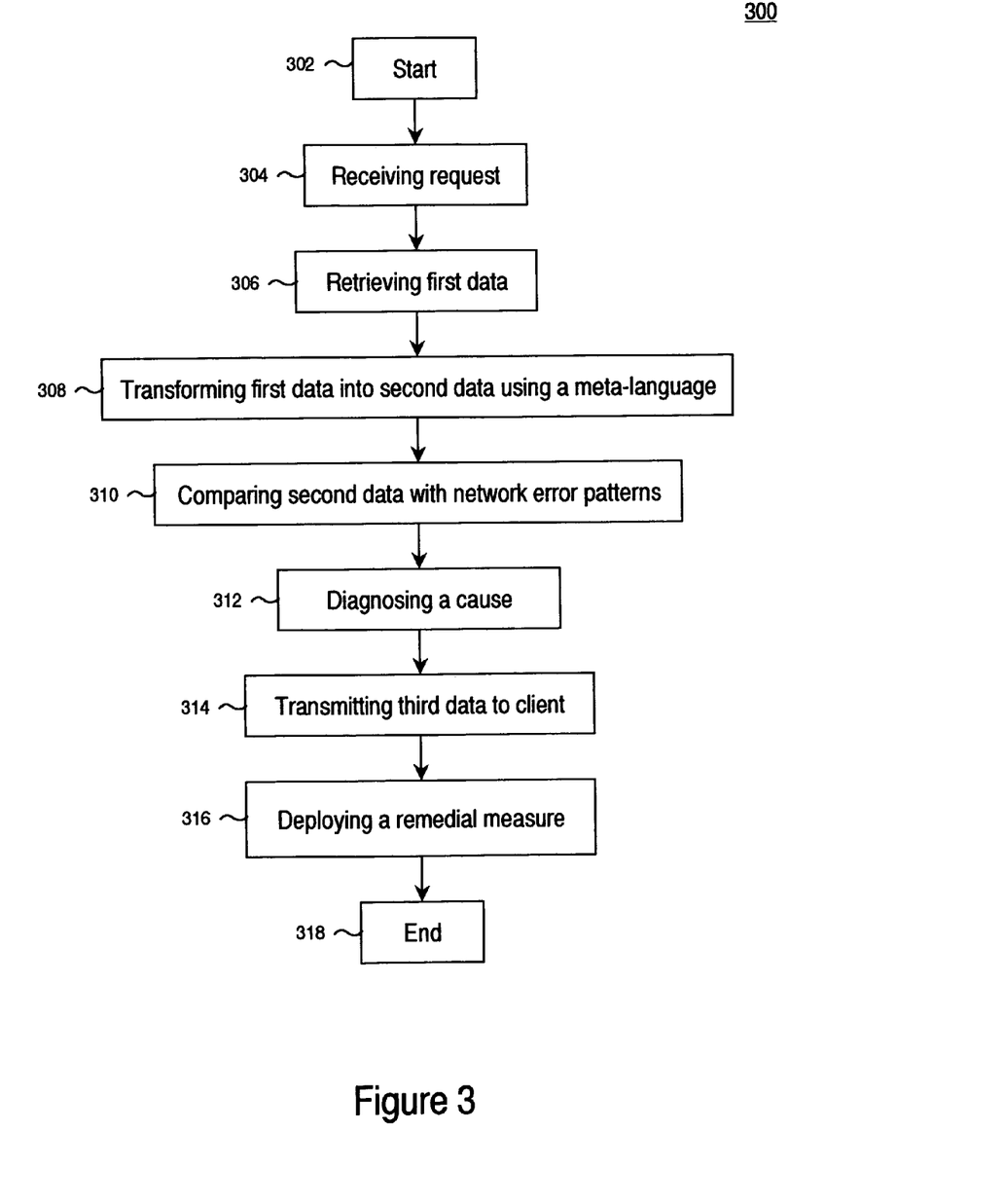
FIG. 3 illustrates a flowchart showing a method of analyzing network fault patterns, according to an embodiment.

FIG. 3 illustrates a flowchart showing a method 300 of analyzing network fault patterns, according to an embodiment. In one embodiment, method 300 is implemented by the network fault pattern analyzer 114 or 214 (FIGS. 1 and 2A-2C). The network fault pattern analyzer may be connected to the client directly or indirectly via the network. In one embodiment, the network fault pattern analyzer may be a plugin to an existing network manager application. In another embodiment, the network fault pattern analyzer is a standalone application that uses well-defined interfaces to extract information from a separate network management application. Though specific steps are disclosed in flowchart 300, such steps are exemplary. That is, embodiments of the present embodiment are well suited to performing various other additional steps or variations of the steps recited in flowchart 300. It is appreciated that the steps in flowchart 300 may be performed in an order different than presented. At block 302 of FIG. 3, the process starts.

At block 304 of FIG. 3, in one embodiment, a request from a client specifying information (e.g. network fault signatures, potential root causes of network fault signatures, and potential remedial measures that may be taken by the client) is received. A client can be an individual user, an individual user device, an enterprise, a service provider, or an application program. Also, there can be multiple numbers and/or types of clients simultaneously. In one embodiment, a plurality of requests is received. In another embodiment, the method 300 does not include receiving a request from a client; instead the network fault pattern analyzer continuously monitors the network for problems without prompting by the client.

At block 306, in one embodiment, a first set of data (also called first data) is retrieved by the network fault pattern analyzer. The network fault pattern analyzer can retrieve and/or access first data from more than one source and more than one type of sources. For example, in one embodiment, the network fault pattern analyzer retrieves first data from the client. In another embodiment, the network fault pattern analyzer retrieves first data from the various devices connected to the network. The network fault pattern analyzer can retrieve data first from one source and then retrieve data from another source if retrieval from the first source did not provide enough information to effectively analyze the network for problems. The network fault pattern analyzer can also access data within its own memory and/or databases at various times throughout the process of analyzing network fault patterns.

First data can include a variety of information; it may be expressed in a variety of forms and may be retrieved by a plurality of means. For example, in one embodiment, because the devices connected to the network are from various vendors, first data retrieved by the network fault pattern analyzer includes information of limited commonality across heterogeneous devices which may be retrieved using vendor-specific or device-specific protocols and delivered in variant formats. In another embodiment, devices connected to the network are from one vendor and thus the first set of data retrieved by the network fault pattern analyzer is in one language and is retrieved using a consistent protocol and delivered in a consistent format. At block 308, first data is transformed by the network fault pattern analyzer into a second set of data (also known as second data) using a meta-language. In embodiments with data of limited commonality across heterogeneous devices, first data is transformed into second data using a meta-language in order to remove constraints.

At block 310 of FIG. 3, in one embodiment, second data is compared with known network fault patterns for a match. In one embodiment, second data includes the information contained in first data expressed in a meta-language. In another embodiment, second data includes a subset of the information contained in first data expressed in a meta-language. Furthermore, known network fault patterns (also referred to as fault patterns) may be accessed in a various ways for matching with second data. For example, in one embodiment, fault patterns can be stored in a database within the network fault pattern analyzer for access by the network fault pattern analyzer. In another embodiment, fault patterns may be stored in a database by which the network fault pattern analyzer is able to access via the network.

In addition, known fault patterns may be accessed from multiple numbers and/or types of sources. For example, in one embodiment, the network fault pattern analyzer first accesses the known fault patterns in its memory. Then if the known fault patterns from its memory are insufficient, the network fault pattern analyzer accesses additional known fault patterns from a non-localized database via the Internet. In another embodiment, the network fault pattern analyzer receives known fault patterns that are directly input from the client.

In further reference to block 310 of FIG. 3, second data may also be scanned to see if it matches any known fault patterns. If a match is found between second data and a known network fault pattern, then the network fault pattern analyzer identifies the matched network fault signature. A matched network fault signature can indicate various common and well-understood problems with the network traffic, devices, or end nodes. A matched network fault signature can also indicate various problems experienced within the network, which are not as common and well-understood. For example, a client with particular knowledge of various uncommon problems may input known fault patterns which when matched with the second data would identify those specific uncommon problems.

In block 312 of FIG. 3, the fault analyzer uses one or more matched network fault signature(s) to infer one or more potential root cause(s) of the network issue(s) that produced the matched network fault signature(s). Identification of one or more potential root causes of the matched network fault signature(s) may assist the client in discovering and remediating existing or emerging issues within the network. The potential root cause of one or more network problems corresponding to network fault signature(s) can be diagnosed by reviewing the known potential root causes or the matched network fault signatures, ruling out as many of the potential causes as possible given other known data regarding the network topology, state, and configuration so that the resulting list of potential root causes contains only those that are plausible within the network being analyzed. The patterns indicating potential root causes can be stored in a localized database within the network fault pattern analyzer or in non-localized database to be accessed by the network fault pattern analyzer via the network. In one embodiment, a pattern indicating potential root causes is inputted into the network fault pattern analyzer directly, or indirectly via the network.

In block 314 of FIG. 3, the fault analyzer transmits a set of information (also referred to as third data) to the client. The third data may include, but is not limited to, a list of the various problems detected within the network, a list of matched network fault signatures, and potential root causes of the network issues corresponding to the matched network fault signatures. The third data may also include possible remedial measures that the client could take for each of the potential root causes identified. In one embodiment, the third data includes options of possible remedial measures that the client may select for the network fault pattern analyzer to take.

In block 316 of FIG. 3, in one embodiment, the network fault pattern analyzer deploys a remedial measure suggested by the network fault pattern analyzer and selected by the client. In another embodiment, the network fault pattern analyzer may suggest appropriate remedial measures based on information from a database. The database may be localized within the network fault pattern analyzer, or the database may be a non-localized database, which the network fault pattern analyzer may access via the network. There may also be more than one database utilized by the network fault pattern analyzer. In addition, the network fault pattern analyzer can receive input from the client throughout the process of analyzing network issues. For example, in one embodiment, the client sends a command to the network fault pattern analyzer to deploy a remedial measure that was not on the list of suggested remedial measures created by the network fault pattern analyzer. In another embodiment, the network fault pattern analyzer is configured to automatically deploy certain remedial measures the network fault pattern analyzer might suggest after identifying network problems. In yet another embodiment, the network fault pattern analyzer does not suggest remedial measures, nor does the network fault pattern analyzer deploy remedial actions. At block 318, the process ends.

Thus, by being able to transform and/or translate the first set of data received into a second set of data using a metalanguage, the network fault pattern analyzer can utilize first data as if first data is of one uniform language. This allows the network fault pattern analyzer to undertake a depth of analysis that is not usually readily available in products that support heterogeneous and/or multi-vendor devices. For example, conventionally, because multiple vendors of devices equate to heterogeneous environments with limited commonality across those heterogeneous devices, most network management solutions are limited in their ability to utilize data from different vendors and instead focus on presentation of the available data for the user's consumption and analysis. Consequently, in general, network management solutions that are directed toward networks with heterogeneous devices focus more on breadth of support rather than depth of support and analysis. Furthermore, the fault analyzer is unlike other conventional network management solutions which often provide only basic reporting capabilities when it comes to monitoring the operational state of a network. The network fault pattern analyzer can advantageously suggest or even provide effective command and control capabilities within heterogeneous environments and a diagnosis of the potential root causes of existing or emerging issues within a network. This means that the network fault pattern analyzer may offload tedious, time-consuming data analysis for network administrators and/or provide expertise in analysis for less experienced administrators. In addition, the network fault pattern analyzer may detect problems within the network that would otherwise not be found until they blossom into a crisis.

Figure 4:
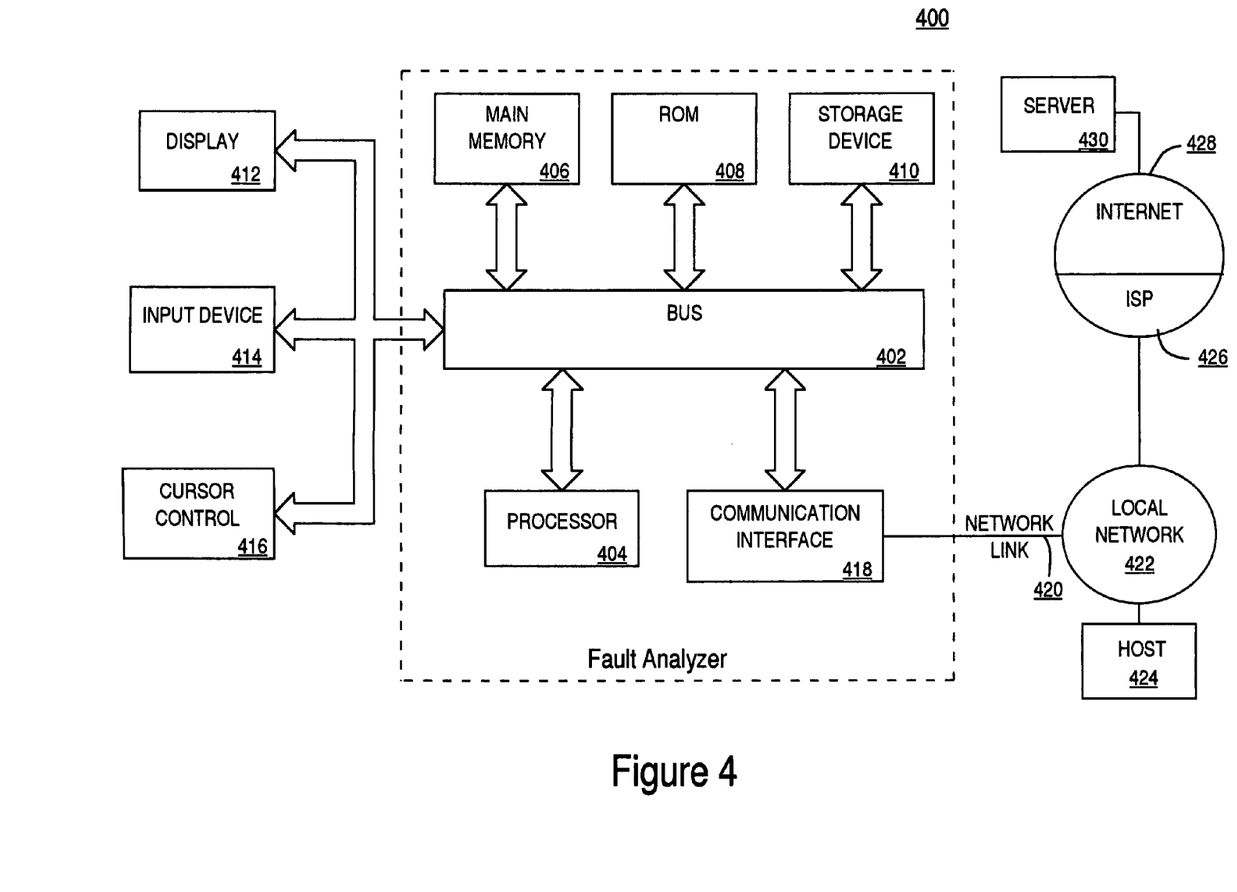
FIG. 4 is a block diagram that illustrates an exemplary system upon which embodiments may be implemented.

FIG. 4 is a block diagram that illustrates an exemplary system 400 upon which embodiments may be implemented. Fault analyzer 401 includes a bus 402 or other communication mechanism for communicating information, and a processor 404 coupled with bus 402 for processing information. Fault analyzer 401 also includes a main memory 406, such as a random access memory (RAM) or other dynamic storage device, coupled to bus 402 for storing information, databases (e.g., a known network fault patterns database and possibly a remedial measures database), and instructions to be executed by processor 404. Main memory 406 also may be used for storing temporary variables or other intermediate information during execution of instructions to be executed by processor 404. Fault analyzer 401 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. Storage device 410 may also include a database of known network fault patterns and a database of corresponding remedial measures.

Fault analyzer 401 may be coupled via bus 402 to an optional display 412 for displaying information to a computer user. For example, display 412 may be used to display information such as network fault signatures, potential root causes of fault(s) corresponding to a network fault signature, a list of the various problems experienced by the network, and the possible remedial measures to be taken by the client. An input device 414, including alphanumeric and other keys, may be coupled to bus 402 for communicating information and command selections to processor 404. Another type of user input device may include a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The various embodiments relate to the use of fault analyzer 401 for analyzing network fault patterns. According to one embodiment, the analysis of network fault patterns is provided by fault analyzer 401 in response to processor 404 executing one or more sequences of one or more instructions contained in main memory 406. Such instructions may be read into main memory 406 from another computer readable medium, such as storage device 410. Execution of the sequences of instructions contained in main memory 406 causes processor 404 to perform the process steps described herein. For example in one embodiment, the processor 404 retrieves a set of data, transforms that set of data into a second set of data using a meta-language, compares the second set of data with known network fault patterns to identify a matching network fault signature, and diagnoses potential causes of network problems that correspond to the matched network fault signature.

One or more processors in a multi-processing arrangement may also be employed to execute the sequences of instructions contained in memory 406. In alternative embodiments, hard-wired circuitry may be used in place of or in combination with software instructions to implement the invention. Thus, embodiments are not limited to any specific combination of hardware circuitry and software. For example, according to one embodiment, processor 404 is an example of processor 224 of FIGS. 2A, 2B, and 2C. In addition, according to another embodiment, components 216, 218, 220, 226, and 228 of FIGS. 2A, 2B, 2C are implemented with software that is executed by processor 404 of FIG. 4.

Referring back now to FIG. 4, the term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media include coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to fault analyzer 401 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Fault analyzer 401 may also include a communication interface 418 coupled to bus 402. Communication interface 418 may provide a two-way data communication coupling to a network link 420 that is connected to a local network 422. For example, communication interface 418 may be an integrated services digital network (ISDN) card or a modem to provide a data communication connection to a corresponding type of telephone line. Communication interface 418 may also include a receiving component and a transmitting component. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information, such as known network fault patterns and a corresponding network fault signature.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from fault analyzer 401, are example forms of carrier waves transporting the information.

Fault analyzer 401 can send and receive data, including program code and network fault information, through the network(s) provided by network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410 or other non-volatile storage for later execution. In this manner, fault analyzer 401 may obtain application code in the form of a carrier wave.

In the foregoing specification, embodiments have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for analyzing network fault patterns, said method comprising:
    retrieving first data associated with a network and a plurality of devices, wherein said first data is comprised of network state information and network topology information associated with said network and said devices;
    transforming said first data into second data using a meta-language, wherein said second data preserve at least a subset of information contained in said first data;
    comparing said second data with a plurality of known network fault patterns, wherein if said second data is consistent with a known network fault pattern of said fault patterns, then a matched network fault signature is identified; and
    diagnosing a cause of a network problem corresponding to said matched network fault signature.

2. The method as recited in claim 1 further comprising receiving a request for third data associated with said network and said plurality of devices.

3. The method as recited in claim 1 further comprising transmitting third data for said network to a client.

4. The method as recited in claim 1 further comprising deploying remedial measures.

5. The method as recited in claim 1 wherein said diagnosing comprises utilizing a database.

6. The method as recited in claim 1 wherein said diagnosing comprises utilizing input from a client for identifying said known network fault pattern corresponding to said network fault signature.

7. The method as recited in claim 1 wherein said known network fault patterns are stored in a database.

8. The method as recited in claim 1 wherein said retrieving comprises collecting said first data from a source selected from the group consisting of: a network manager application, a client, and said plurality of devices.

9. A computer system comprising:

a bus;

a memory unit coupled to said bus for storing a database comprising known network fault patterns;

a receiving component coupled to said bus, said receiving component used for receiving first data comprised of network state data and network topology data;

a translation component coupled to said bus, said translation component used for translating first data into second data using a meta-language;

a comparator coupled to said bus, said comparator used for comparing said second data with said known network fault patterns to find a matching network fault signature; and a processor coupled to said bus, said processor used for determining a cause of a network problem corresponding to said matched fault signature.

10. The system as recited in claim 9 wherein said receiving component receives a request for third data associated with said network and said plurality of devices.

11. The system as recited in claim 9 further comprising a transmitting component coupled to said bus for transmitting third data to a client.

12. The system as recited in claim 9 further comprising a remedial measure component coupled to said bus for deploying a remedial measure.

13. The system as recited in claim 9 wherein said comparator utilizes a database to find said network fault signature.

14. The system as recited in claim 9 wherein said comparator utilizes an input from a client for said known network fault pattern corresponding to said network fault signature.

15. The system as recited in claim 9 wherein said processor utilizes an input from a client for determining said cause of said fault signature.

16. The system as recited in claim 9 wherein said known network fault patterns are stored in a database.

17. The system as recited in claim 9 wherein said receiving component collects said first data from a source selected from the group consisting of: a network manager application, a client, and a plurality of devices.

18. A computer-usable storage medium having computer-readable program code embodied therein for implementing a method of analyzing network fault patterns, said method comprising:

monitoring a network comprising a plurality of devices, wherein said monitoring includes receiving first data associated with said network and said devices, and wherein first data is transformed into second data using a meta-language;

scanning said second data for a pattern, wherein if said pattern is consistent with one of a plurality of known network fault patterns, then a network fault signature is identified; and determining a cause of a network problem corresponding to said fault signature.

19. The computer-usable storage medium as recited in claim 18 further comprising receiving a request for third data associated with said network and said plurality of devices.

20. The computer-usable storage medium as recited in claim 18 further comprising transmitting third data for said network to a client.

21. The computer-usable storage medium as recited in claim 18 further comprising deploying remedial measures.

22. The computer-usable storage medium as recited in claim 18 wherein said scanning comprises utilizing a database.

23. The computer-usable storage medium as recited in claim 18 wherein said scanning comprises utilizing input from a client for identifying said network fault signature.

24. The computer-usable storage medium as recited in claim 18 wherein said known network fault patterns are stored in a database.

25. The computer-usable storage medium as recited in claim 18 wherein said monitoring comprises collecting said first data from a source selected from the group consisting of: a network manager application, a client, and said plurality of devices.

* * * * *